C. W. GRESSLE.
VEHICLE WHEEL RIM.
APPLICATION FILED JUNE 22, 1916.
1,311,269.
Patented July 29, 1919.
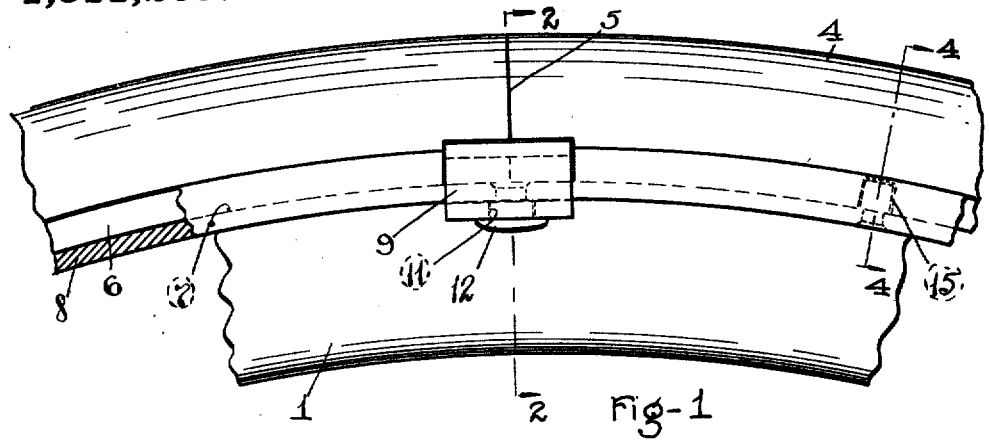
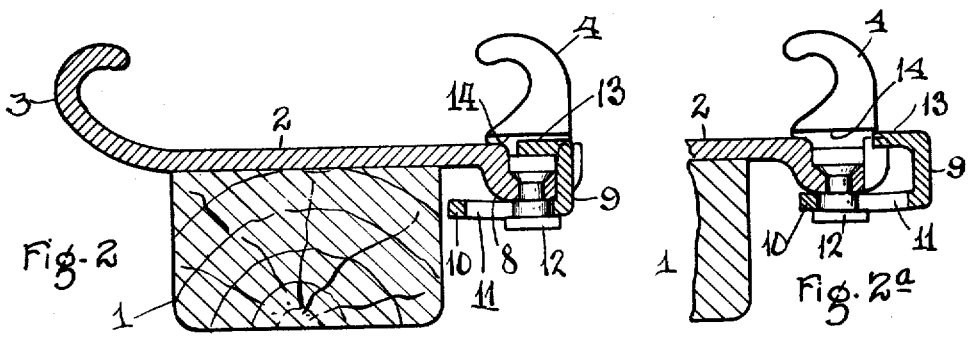
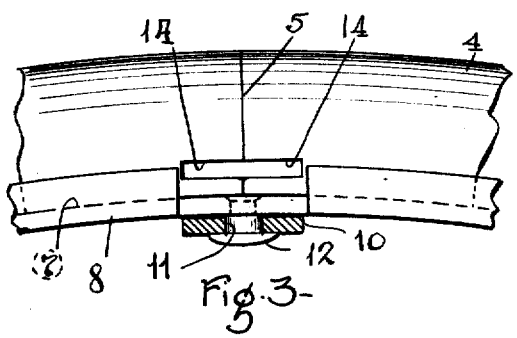
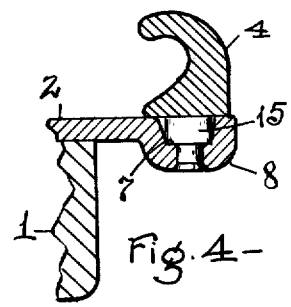
Witnesses:
O. M. Kappler.
Thos H Fay
Inventor:
CHARLES W GRESSLE
by Fay, Oberlin & Fay
Attorneys

UNITED STATES PATENT OFFICE.

CHARLES W. GRESSLE, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

VEHICLE-WHEEL RIM.

1,311,269.  Specification of Letters Patent.  Patented July 29, 1919.

Application filed June 22, 1916. Serial No. 105,148.

*To all whom it may concern:*

Be it known that I, CHARLES W. GRESSLE, a citizen of the United States, and a resident of Cleveland, county of Cuyahoga, and State of Ohio, have invented a new and useful Improvement in Vehicle-Wheel Rims, of which the following is a specification, the principle of the invention being herein explained and the best mode in which I have contemplated applying that principle, so as to distinguish it from other inventions.

The present improvements, relating as indicated to a vehicle wheel rim, have more particular regard to so-called Q. D., or quick detachable rims for pneumatic tires, such as are largely used in connection with automobiles. This trade-name is somewhat of a misnomer, for the rim itself is not actually detachable at all, but merely has a side flange which may be detached in order to facilitate the placing on and removal of a tire on the rim. The object of the present invention is to provide improved locking means for securing such detachable side flange in place on the rim, and to the accomplishment of such object the invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1 is a side elevation of a broken section of a wheel felly with a so-called quick detachable rim mounted thereon and equipped with my improved locking means; Fig. 2 is a transverse sectional view of the same, the plane of the section being indicated by the line 2—2, Fig. 1; Fig. 2ª is a broken view, similar to Fig. 2, showing the locking device in a different operative position; Fig. 3 is a side elevational view of the rim and locking device with a portion of the latter broken away and shown in section in order more clearly to reveal the construction and relation of the parts; and Fig. 4 is a transverse sectional view of a detail taken on the plane indicated by the line 4—4, Fig. 1.

The construction of a wheel body, of which a portion of the felly 1 only is shown in the aforesaid drawings, is a matter of indifference so far as the present invention is concerned, it being for this reason that only such felly is illustrated. The rim 2, shown as of the plain clencher type, is directly mounted on such wheel body, and as illustrated, is generally provided with an integral tire-retaining flange 3 along its one edge, namely, the edge which is disposed toward the body of the vehicle, although if desired a separable, reversible flange may be substituted, as will be readily understood.

It is to the other flange 4 and the locking means provided in connection therewith, that attention is more especially directed in the present connection. Such flange, as usual, in order that it may be detachably secured to the rim, is transversely split at one point, as 5, in its circumference and has its inner edge 6 formed to seat in an encircling groove or depression 7, adjacent the corresponding edge of the rim. A corresponding bead 8 is of course formed on the under side of the rim adjacent this edge, and, at a point on such bead adjacent the meeting ends of the split side-flange, a transversely slidable keeper or latch 9 is provided.

Such latch is of general U-shape in cross section, the one leg 10 being longer than the other, and being provided with a slot 11 through which passes a headed stud 12, riveted through the bottom wall of the groove and projecting radially inwardly, as clearly shown in Figs. 2 and 3. The outer wall of the beading is cut away as best shown in Fig. 3, at the point in question so as to expose a portion of the base of each end of the flange 4 and permit the upper or shorter leg 13 of the keeper to enter two complementary slots 14 formed in such flange ends, respectively.

The length of the slot 11 in the lower leg of the keeper is such as to permit the latter to be drawn outwardly, that is to the right as shown in Fig. 2, a distance sufficient to cause such upper leg 13 to entirely clear these slots, as shown in Fig. 2ª. Thereupon, the ends of the side flange may be readily pried out of the groove and the flange completely detached from the rim.

When it is desired to restore such side flange into operative position on the rim, it is simply sprung into place in the groove 7, with its split ends in line with the aforesaid keeper, and the latter is then moved into its inner position as shown in Fig. 2. In order to prevent accidental outward movement of the keeper, the inner end of the legs are bent slightly together so that such keeper, which has more or less resilient action, will thus be naturally retained in its flange-engaging position.

In order to assist in locating the split side flange properly circumferentially of the rim, a stud or projection 15 is provided in the groove, at some convenient point, preferably near by the keeper 9, and the base of the rim is notched or slotted at the proper point to engage with such projection, as shown in Figs. 1 and 4.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination with a wheel rim; of a split side-flange removably mounted on said rim, said flange being adapted when in place to interlock laterally with said rim and having complementary transverse slots in its abutting ends; and a locking member for said flange attached to said rim so as to be movable transversely thereof and adapted to resiliently engage with the slots in such flange-ends to hold the latter against radially outward movement.

2. The combination with a wheel rim; of a split side-flange removably mounted on said rim, said flange being adapted when in place to interlock laterally with said rim and having complementary transverse slots formed directly in its abutting ends; and a locking member for said flange attached to the under side of said rim so as to be movable transversely thereof and having a recurved portion adapted to resiliently engage with the slots in such flange-ends to hold the latter against radially outward movement.

3. The combination with a wheel rim; of a split side-flange removably mounted on said rim, said flange being adapted when in place to interlock laterally with said rim and having complementary transverse slots formed directly in its abutting ends; and a U-shaped locking member having one leg longer than the other, such longer leg being closely slidably attached to the under side of said rim so as to adapt said member to move transversely thereof and the shorter leg of said member being adapted to engage with the slots in such flange-ends to hold the latter against radially outward movement.

4. The combination with a wheel rim having an encircling groove adjacent its one edge; of a split side-flange adapted to seat in such groove and thereby interlock laterally with said rim, said flange having complementary transverse slots formed directly in its abutting ends; a stud on the under side of said rim adjacent the edge in question; and a U-shaped locking member having one leg longer than the other, such longer leg being slotted to slidably fit over said stud and being held in close contact with the under side of the rim by said stud and the shorter leg of said member being adapted to engage with the slots in such flange-ends to hold the latter against radially outward movement.

5. The combination with a wheel rim having an encircling groove adjacent its one edge and a corresponding bead formed on the under side of the rim adjacent such edge; of a split side-flange adapted to seat in such groove and thereby interlock laterally with said rim, the inner edge of said flange being wholly contained within such groove and said flange having complementary transverse slots formed directly in its abutting ends; a stud on the under side of said rim adjacent the edge in question, the corresponding outer wall of such bead being cut away to expose the flange ends in question; and a U-shaped locking member having one leg longer than the other, such longer leg being slotted to slidably fit over said stud, and the shorter leg of said member being adapted to engage with the slots in such flange-ends to hold the latter against radially outward movement, the intermediate portion of said member fitting in the cutaway portion of the outer bead-wall.

6. The combination with a wheel rim having an encircling groove adjacent its one edge; of a split side-flange adapted to seat in such groove and thereby interlock laterally with said rim, said flange having complementary transverse slots formed in its abutting ends; a stud on the under side of said rim adjacent the edge in question; and a U-shaped locking member having one leg slotted to slidably fit upon said stud, the other leg of said member being adapted to resiliently engage with the slots in such flange ends to hold the latter against radially outward movement.

Signed by me this 19th day of June, 1916.

CHARLES W. GRESSLE.

Attested by—
NATHAN F. FRETTER,
HARRY H. LECKLER.